United States Patent
Garruba

(10) Patent No.: US 9,540,115 B2
(45) Date of Patent: Jan. 10, 2017

(54) DUAL MODE FRANGIBLE REFUELING NOZZLE

(71) Applicant: Jon F. Garruba, Dix Hills, NY (US)

(72) Inventor: Jon F. Garruba, Dix Hills, NY (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 133 days.

(21) Appl. No.: 14/698,515

(22) Filed: Apr. 28, 2015

(65) Prior Publication Data

US 2016/0318621 A1    Nov. 3, 2016

(51) Int. Cl.
*B64D 39/06* (2006.01)
*B64D 39/04* (2006.01)

(52) U.S. Cl.
CPC .............. *B64D 39/06* (2013.01); *B64D 39/04* (2013.01)

(58) Field of Classification Search
CPC .......... B64D 39/00; B64D 39/04; B64D 39/06
See application file for complete search history.

(56) References Cited

U.S. PATENT DOCUMENTS

| | | | |
|---|---|---|---|
| 6,375,123 B1 | 4/2002 | Greenhalgh et al. | |
| 7,137,597 B2 | 11/2006 | Schuster et al. | |
| 7,281,687 B2 | 10/2007 | Schroeder | |
| 7,516,920 B2 | 4/2009 | Schroeder | |
| 7,798,449 B2 | 9/2010 | Small et al. | |
| 7,894,950 B2 | 2/2011 | Williamson et al. | |
| 8,561,947 B2 | 10/2013 | Feldmann et al. | |
| 2008/0017757 A1 | 1/2008 | Schroeder | |

FOREIGN PATENT DOCUMENTS

WO    WO 2014/133632 A2    9/2014

*Primary Examiner* — Nicholas McFall
(74) *Attorney, Agent, or Firm* — Tarolli, Sundheim, Covell & Tummino LLP

(57) ABSTRACT

An in-flight refueling probe includes a first tubular member secured to an aircraft and a second tubular member having a releasable connection with the first tubular member such that the second tubular member detaches from the first tubular member in response to a predetermined force applied to the connection. A nozzle secured to the second tubular member can be coupled to a receptacle of a fuel dispensing aircraft. A tethering member is connected to the first tubular member and one of the second tubular member and the nozzle. The tethering member remains intact to connect the detached second tubular member to the first tubular member when a first tensile force is applied to the tethering member. The tethering member ruptures to disconnect the detached second tubular member from the first tubular member when a second tensile force greater than the first tensile force is applied to the tethering member.

19 Claims, 13 Drawing Sheets

| Condition | Short Description | Detailed Description | Applied Force 1 |
|---|---|---|---|
| A | Bump | Refueling probe bumps the inside or outside of the drogue while attempting to engage. Force exceeds CBF threshold liberating nozzle from probe. | > CBF |
| B | Drogue Release Stuck | Refueling probe is engaged in drogue but release mechanism fails. Attempt to separate results in force exceeding CBF threshold. | > CBF |
| C | Improper Drogue Separation | Refueling probe is engaged in drogue but refueling aircraft motion is lateral | > CBF |
| D.1 | Hose Whip Engaged | Hose whip induced by excessive closure rate during mating. Nozzle does not engage drogue prior to whip but is in close proximity or partially engaged. | > CBF |
| D.2 | | | > CBF |
| D.3 | Hose Whip Disengaged | Hose whip induced by excessive closure rate during mating. Nozzle Properly engages drogue prior to whip | > CBF |

| Name | Description | Value (lbs) |
|---|---|---|
| CBF | Controlled Break Feature | 1500-2000 |
| SP2 | Setpoint 2 | DR < SP2 < CBF |
| DR | Drogue Release | 400 |
| SP1 | Setpoint 1 | SP1 < DR1 |
| AD | Aero Drag | variable |

FIG. 11A

| Drogue and nozzle state 1 | Applied Force 2 | Tether strength | Drogue and nozzle state 2 | Result | FOD to refueling A/C |
|---|---|---|---|---|---|
| Disengaged | 0 (Aero Drag only) | SP1 | Disengaged | Shear forces released through CBF. Nozzle retained by tether. | No |
|  | 0 (Aero Drag only) | SP2 |  |  |  |
| Engaged | > CBF | SP1 | Disengaged | Shear forces released through CBF. Nozzle retained by Drogue, the tether is broken as the setpoint is less than CBF. | No |
|  | > CBF | SP2 |  |  |  |
| Engaged | DR | SP1 | Disengaged | Shear forces released through CBF. Nozzle retained by Drogue, the tether is broken as the setpoint is less than DR | No |
|  | DR | SP2 | Engaged | Shear forces released through CBF. Nozzle retained by tether as the setpoint is greater than DR forcing release | No |
| Engaged | DR | SP1 | Disengaged | Shear forces released through CBF. Nozzle retained by Drogue, the tether is broken as the setpoint is less than DR | No |
|  | DR | SP2 | Engaged | Shear forces released through CBF. Nozzle retained by tether as the setpoint is greater than DR forcing release | No |
| Disengaged | 0 (Aero Drag only) | SP1 | Disengaged | This condition is similar to bump. Shear forces released through CBF. Nozzle retained by tether. | No |
|  | 0 (Aero Drag only) | SP2 |  |  |  |

FIG. 11B

DUAL MODE FRANGIBLE REFUELING NOZZLE

GOVERNMENT INTEREST

The invention was made under US Navy Contract Number N00019-13-C-0135. Therefore, the US Government has rights to the invention as specified in that contract.

TECHNICAL FIELD

The present invention relates to aircrafts and, in particular, relates to a refueling probe assembly for an aircraft having multiple controlled break points.

BACKGROUND OF THE INVENTION

The in-flight refueling of aircraft is a very important capability in that it extends the usable range of the aircraft. Typical refueling devices include a fuel tube extending from the refueling aircraft that terminates in a receptacle for receiving a refueling probe, which is connected to the aircraft that sources fuel. Typically, the nozzle at the end of the refueling probe is a Military Standard part, for example, MS 24356(ASG) Nozzle- Type PA-2 Flight Pressure Refueling. The receptacle on the refueling aircraft is also a Military Standard part, for example, MS 24354 (ASG) Drogue Core, Nozzle And Refueling Coupling—Type MA-2 Flight-Pressure-Refueling System-Assembly Of.

SUMMARY OF THE INVENTION

In accordance with an aspect of the present invention, an in-flight refueling probe is provided for an aircraft to be refueled by a fuel dispensing aircraft, which has a receptacle for connecting to the refueling probe. The refueling probe includes a first tubular member secured to the aircraft. A second tubular member has a releasable connection with the first tubular member such that the second tubular member detaches from the first tubular member in response to a predetermined force applied to the connection. A nozzle secured to the second tubular member can be coupled to the receptacle of the fuel dispensing aircraft. The nozzle is in fluid communication with the first tubular member and the aircraft. A tethering member has a first end connected to the first tubular member and a second end connected to one of the second tubular member and the nozzle. In the event the second tubular member is separated from the first tubular member, the tethering member remains intact to connect the detached second tubular member to the first tubular member when a first tensile force is applied to the tethering member. The tethering member ruptures to disconnect the detached second tubular member from the first tubular member when a second tensile force greater than the first tensile force is applied to the tethering member.

In accordance with another aspect of the invention, an in-flight refueling probe is provided for an aircraft to be refueled by a fuel dispensing aircraft having a receptacle for connecting to the refueling probe. The refueling probe includes a first tubular member secured to the aircraft. A second tubular member is releasably connected to the first tubular member by a plurality of fasteners extending through openings in the first and second tubular members. The fasteners rupture in response to a predetermined force being applied to the fasteners to allow the second tubular member to detach from the first tubular member. A nozzle secured to the second tubular member can be coupled to the receptacle of the fuel dispensing aircraft and is in fluid communication with the first tubular member. A tethering member has a first end connected to the first tubular member and a second end connected to one of the second tubular member and the nozzle. The tethering member remains intact or ruptures, in response to applied forces, to control the release of the detached second tubular member from the first tubular member. The applied forces may be induced through various conditions, including but not limited to, excessive bump, drogue release latch stuck, improper drogue separation, and hose whip. The tethering member ruptures to disconnect the detached second tubular member from the first tubular member when the nozzle is properly coupled to the receptacle.

In accordance with an aspect of the present invention, an in-flight refueling probe is provided for a fuel dispensing aircraft for refueling an aircraft having a receptacle for connecting to the refueling probe. The refueling probe includes a first tubular member secured to the fuel dispensing aircraft. A second tubular member has a releasable connection with the first tubular member such that the second tubular member detaches from the first tubular member in response to a predetermined force applied to the connection. A nozzle secured to the second tubular member can be coupled to the receptacle of the aircraft. The nozzle is in fluid communication with the first tubular member and the fuel dispensing aircraft. A tethering member has a first end connected to the first tubular member and a second end connected to one of the second tubular member and the nozzle. In the event the second tubular member is separated from the first tubular member, the tethering member remains intact to connect the detached second tubular member to the first tubular member when a first tensile force is applied to the tethering member. The tethering member ruptures to disconnect the detached second tubular member from the first tubular member when a second tensile force greater than the first tensile force is applied to the tethering member.

Other objects and advantages and a fuller understanding of the invention will be had from the following detailed description of the preferred embodiments and the accompanying drawings.

BRIEF DESCRIPTION OF THE DRAWINGS

FIGS. 11A-11B is a chart illustrating examples of conditions in which the tethering member can rupture or can retain the refueling probe with the aircraft.

DETAILED DISCRIPTION OF THE INVENTION

Figure 1:
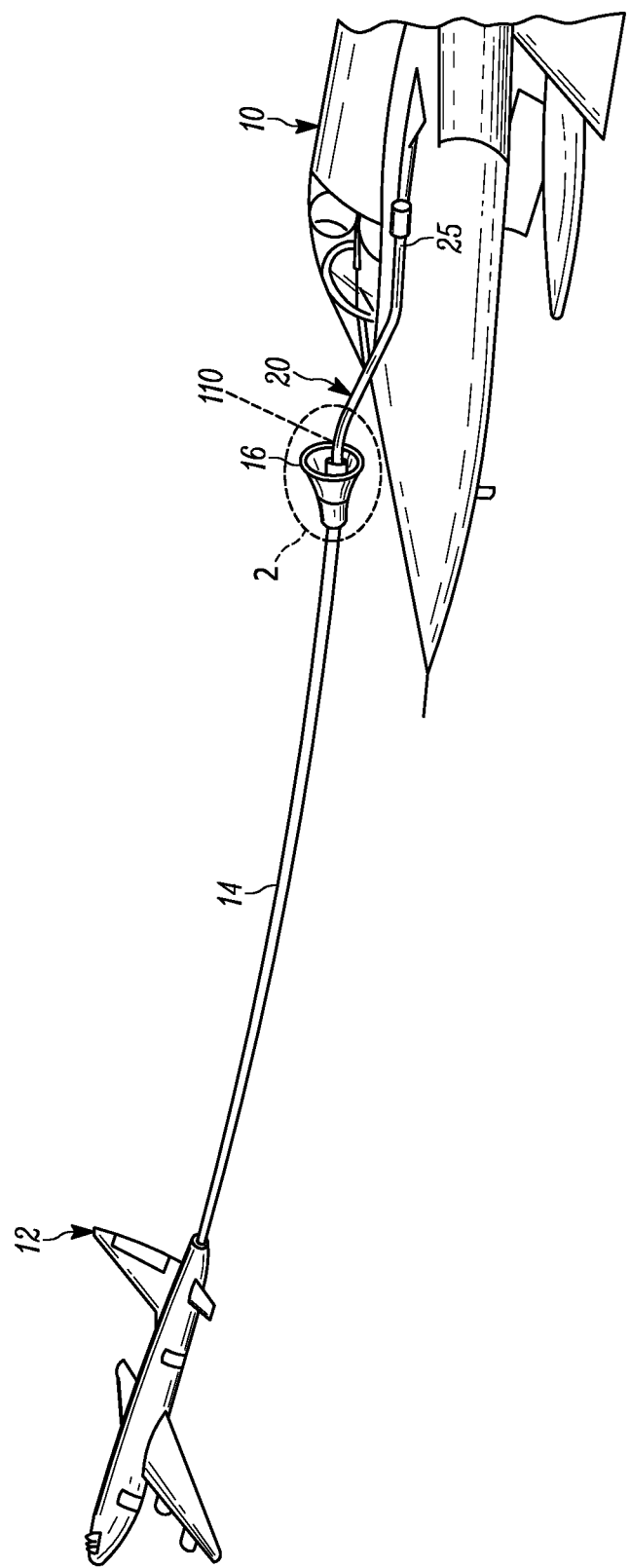
FIG. 1 is a schematic illustration of an aircraft being refueled by a tanker aircraft in accordance with the present invention.
Figure 2:
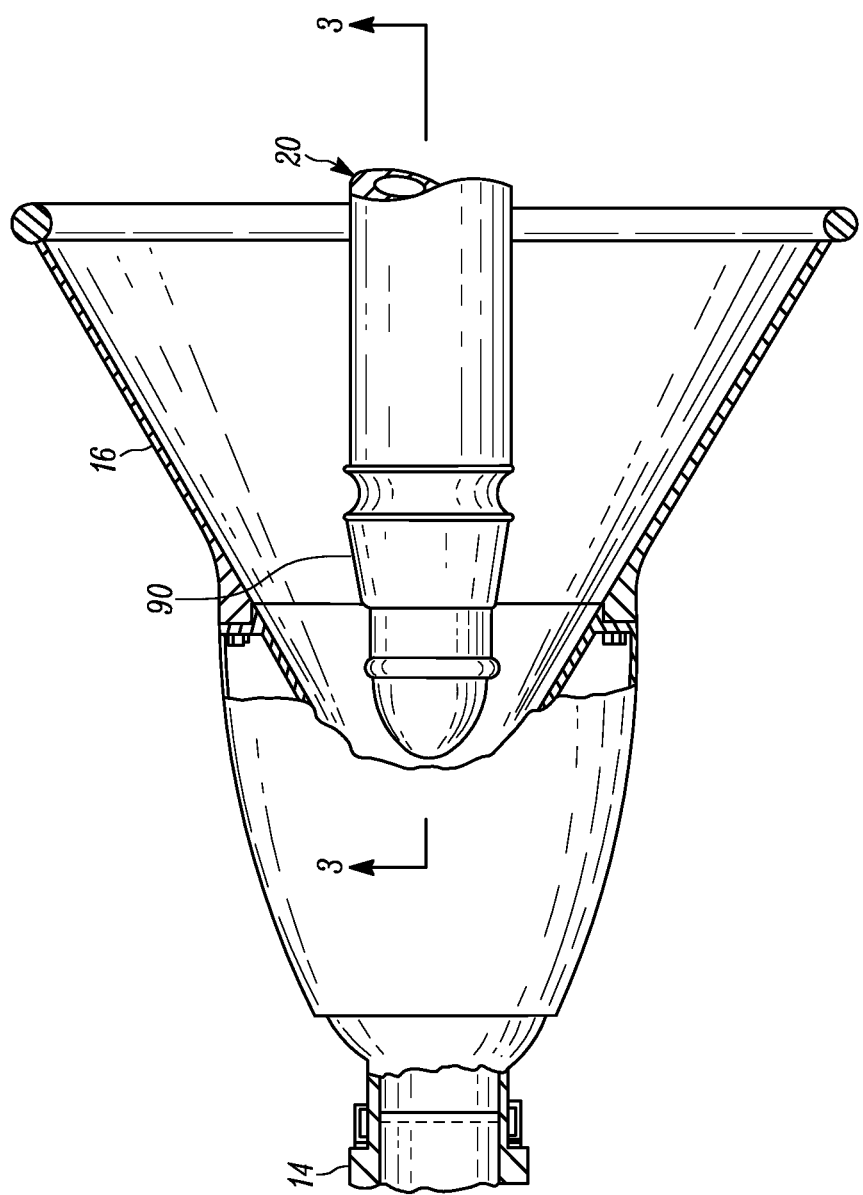
FIG. 2 is an enlarged, partial cross-sectional view of FIG. 1.

The present invention relates to aircrafts and, in particular, relates to a refueling probe assembly for an aircraft having a frangible tip with multiple break points. FIGS. 1 and 2 illustrate an aircraft 10 being refueled by a tanker or refueling aircraft 12 in accordance with an embodiment of the present invention. The tanker 12 includes a refueling apparatus 14 that terminates with a receptacle 16. The receptacle 16 can be a standard design covered by military standard MS 24354 (ASG) Drogue Cone Nozzle And Refueling Coupling-Type MA-2 Flight-Pressure-Refueling System, Assembly Of.

Extending from the aircraft 10 is a refueling probe 20 for releasably connecting to the receptacle 16 in a manner to be discussed. One example refueling probe 20 is illustrated and described in U.S. Pat. No. 7,516,920, the entirety of which is incorporated herein by reference.

It will be appreciated that the receptacle 16 and refueling probe 20 could be switched such that the receptacle is secured to the aircraft 10 and the refueling probe is secured to a boom extending from the tanker 12 (not shown). Consequently, the operator on board the tanker 12 flies the refueling probe 20 into the receptacle 16 on the aircraft 10 to refuel the aircraft. This configuration is known by the air force as a flying boom type refueling system.

Figure 3:
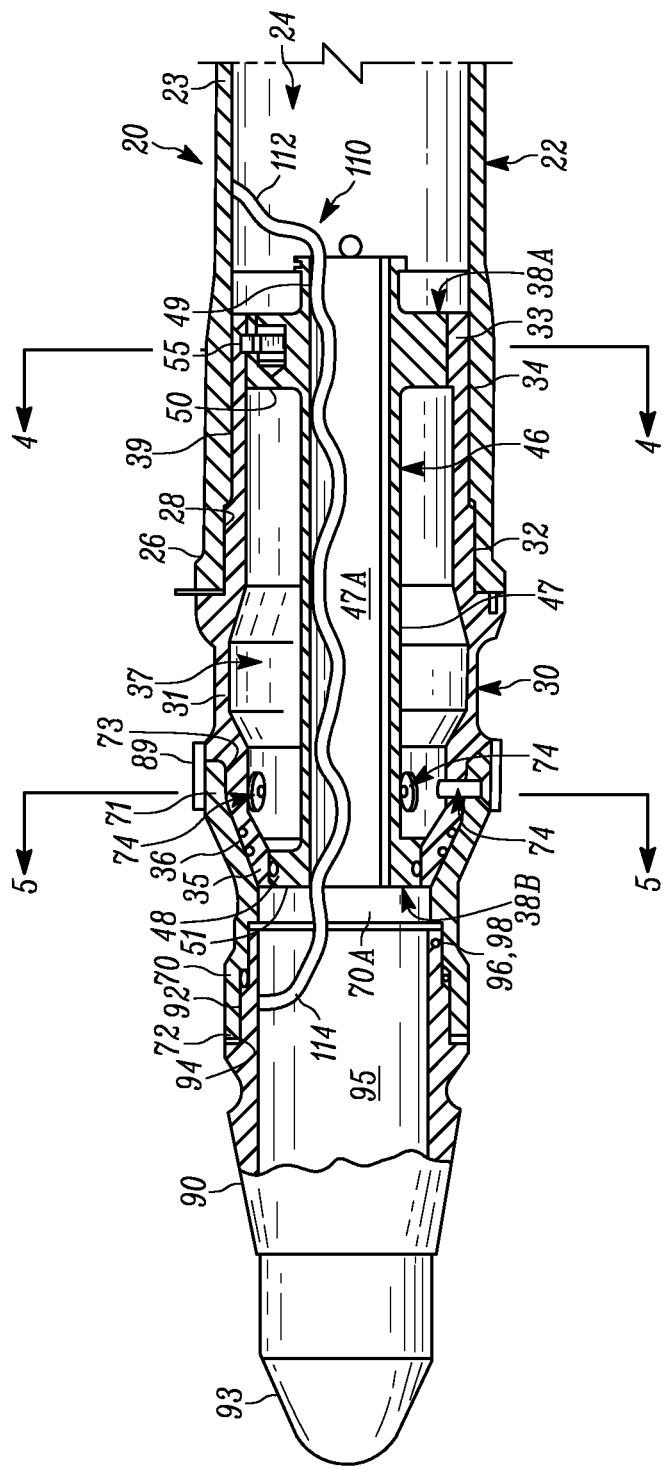
FIG. 3 is a cross-sectional view of FIG. 2 taken along the line 3-3.

Referring to FIG. 3, the refueling probe 20 includes a hollow, tubular assembly 22, a connection assembly 30, a link 70, and a nozzle 90 connected to one another in a generally longitudinal manner. The tubular assembly 22 includes a tube 23 extending from a first end 25 (see FIG. 1) connected to the aircraft 10 to a second end 26 spaced from the aircraft. The second end 26 includes internal threads 28. A passageway 24 extends longitudinally from the first end 25 to the second end 26 through the entire tube 23. The passageway 24 is in fluid communication with a fuel tank (not shown) of the aircraft 10.

The connection assembly 30 includes a tubular fitting 31 extending from a first end 33 to a second end 35. The second end 35 has a curved external surface 36, e.g., a convex, spherical shape. The fitting 31 includes an outer surface 39 having external threads 32 for threadably engaging the internal threads 28 on the second end 26 of the tube 23. When the threads 28, 32 are secured together, the first end 33 of the fitting 31 extends into the passageway 24 of the tube 23. The portion of the fitting 31 that extends into the end 26 of the tube 23 is indicated at 34.

A central cavity 37 extends longitudinally from the first end 33 of the fitting 31 to the second end 35 entirely through the fitting. The cavity 37 is in fluid communication with the passageway 24 of the tube 23 when the fitting 31 and tube are secured together. The cavity 37 includes an opening 38A at the first end 33 of the fitting 31 and a smaller opening 38B at the second end 35 of the fitting.

Although the tube 23 and fitting 31 are illustrated as being separately formed components secured together, it will be appreciated that the tube and fitting could alternatively be integrally formed as a unitary structure. Consequently, the ends 26, 35 and threads 28, 32 of the tube 23 and fitting 31, respectively, would be omitted in such a configuration. Regardless, the tube 23 and fitting 31 cooperate to form a single, tubular member secured to the aircraft 10.

The connector assembly 30 further includes a fuel transfer assembly 46 having a hollow tube 47 extending from a first end 49 to a second end 51. A passageway 47A extends longitudinally from the first end 49 to the second end 51 entirely through the tube 47. The first end 49 includes a radially extending flange 50 having a radially outer surface 59. The second end 51 includes a radially extending flange 48 having a radially outer surface 52. A circumferential groove 54 is formed in the outer surface 52 (see FIG. 6). A hole 60 (see FIG. 7) extends longitudinally into the flange 50 at the first end 49 of the tube 47.

The fuel transfer assembly 46 is positioned in the cavity 37 of the fitting 31 such that the flange 48 is located within the opening 38A and the flange 50 is located within the opening 38B. This places the passageways 47A in fluid communication with the passageway 24 in the tube 23. An O-ring 53 positioned within the groove 54 forms a fluid-tight seal between the flange 48 and the second end 35 of the fitting 31.

Figure 4:
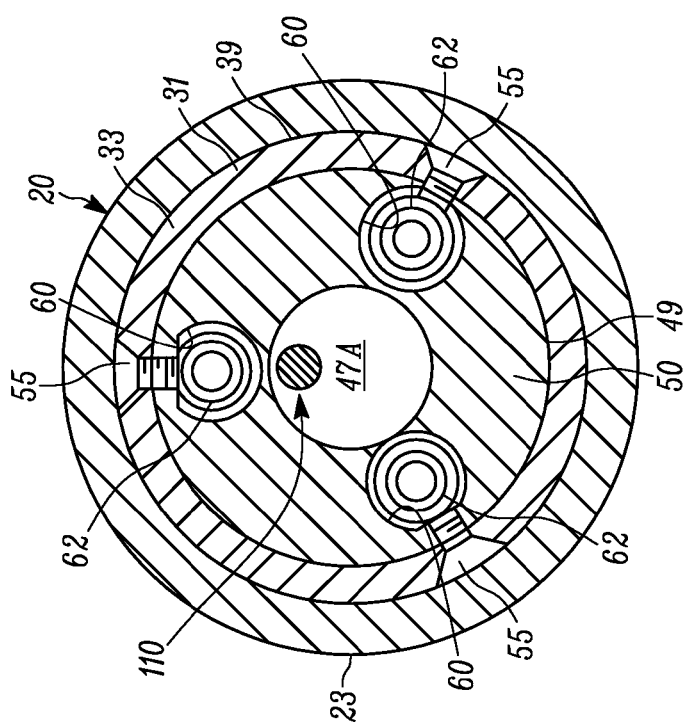
FIG. 4 is a cross-sectional view of FIG. 3 taken along the line 4-4.
Figure 7:
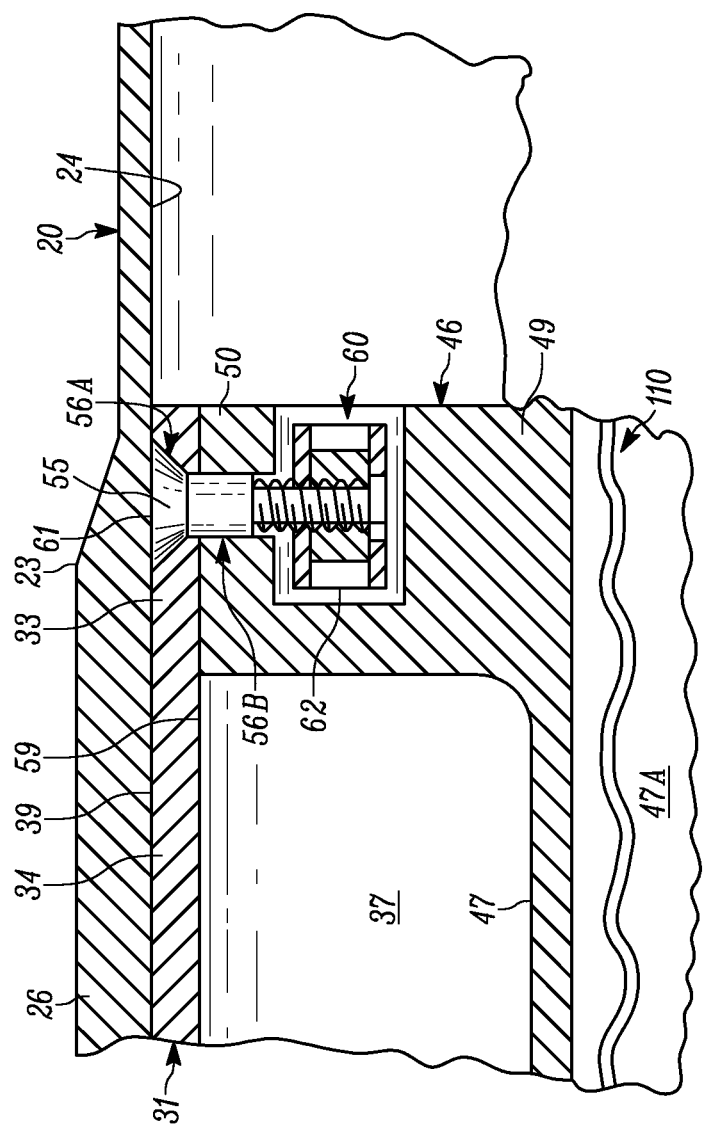
FIG. 7 is an enlarged partial view of FIG. 3 showing details of a fuel transfer assembly.

Referring to FIGS. 3, 4, and 7 the flange 50 of the tube 46 is attached to the first end 33 of the fitting 31 by a plurality of circumferentially arranged fastener assemblies 55. A series of countersunk holes 56A (FIG. 7) extend radially inward from the outer surface 57 of the fitting 31 toward the central cavity 37. A cylindrical hole 56B extends from each countersunk hole 56A, through the outer surface 59 of the flange 50, and radially inward towards the passageway 47A. A cylindrical hole 60 extends longitudinally from the end of the flange 50 to each cylindrical hole 56B. A barrel nut 62 is mounted in each hole 60. A fastener 61 is installed in each pair of holes 56A and 56B and secured to the corresponding barrel nut 62. This locks the first end 33 of the fitting 31 and the first end 49 of the tube 47 together within the tube 23.

Referring to FIG. 3, the link 70 constitutes a hollow tube extending from a first end 71 to a second end 72. The first end 71 has an inner curved surface 73 adapted to mate with the externally curved surface 36 on the second end 35 of the fitting 31. Consequently, the inner surface 73 can have any shape, so long as it matches the shape of the outer surface 36 on the fitting 31. A passage 70A extends longitudinally from the first end 71 to the second end 72 entirely through the link 70.

Figure 5:
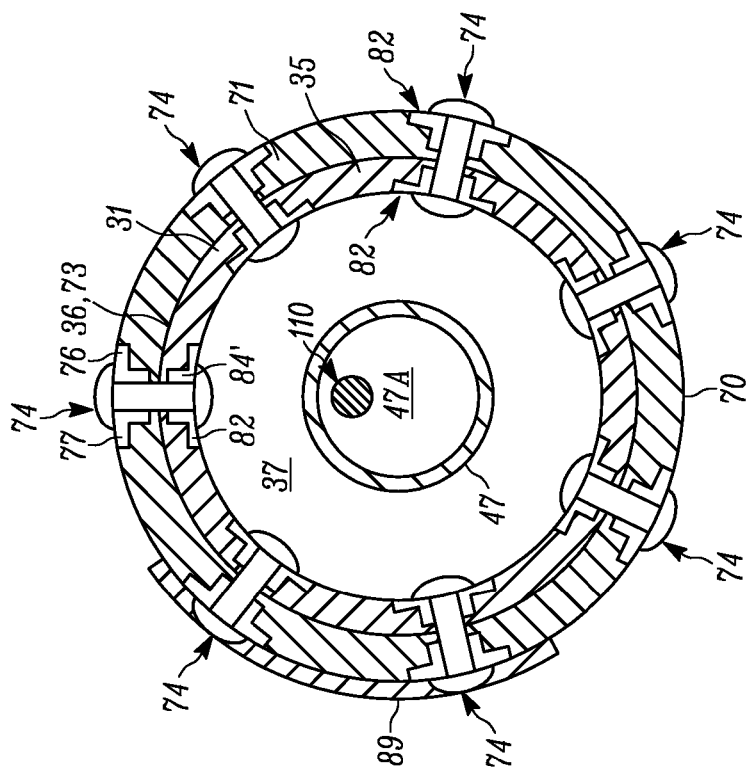
FIG. 5 is a cross-sectional view of FIG. 3 taken along the line 5-5.

A series of releasable connections 74 couple the link 70 to the fitting 31. In one example, the releasable connections constitute rupturable fasteners 74 circumferentially arranged about the periphery of the link 70. The fasteners 74 can be symmetrically or asymmetrically spaced about the link 70. As shown in FIG. 5, seven fastener assemblies 74 are symmetrically arranged about the periphery of the link 70. It will be appreciated that more or fewer fastener assemblies 74 can be provided. It will also be appreciated that the releasable connections 74 can alternatively constitute welds, adhesive joints, fastener types different from what is shown or other controlled break features (not shown).

Figure 6:
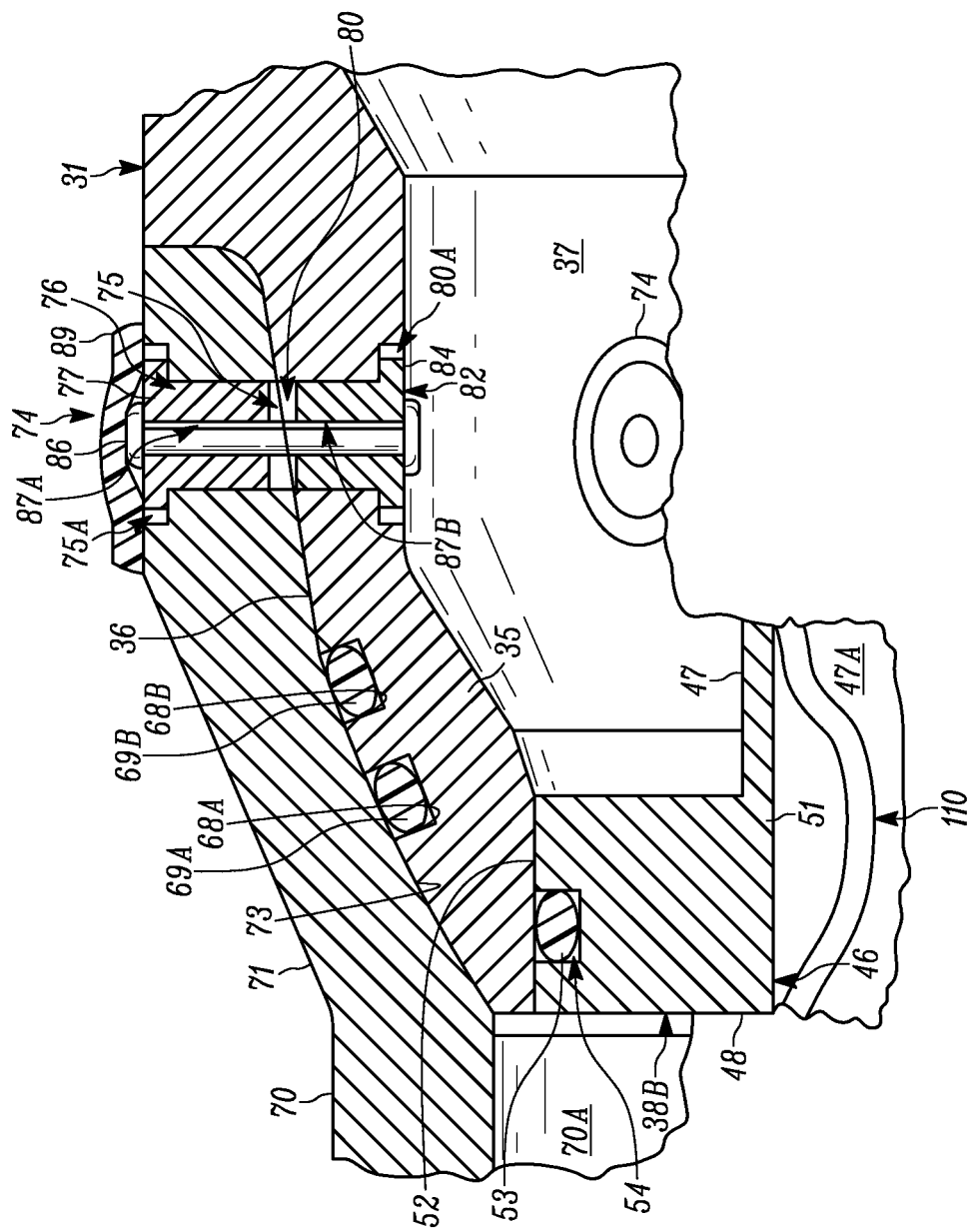
FIG. 6 is an enlarged partial view of FIG. 3 showing details of bushings and fasteners.

Referring to FIGS. 5 and 6, radially extending holes are formed through the link 70 and the fitting 31 to the cavity 37. Each hole includes a counterbore 75A extending radially inward from the outer periphery of link 70. A counterbore 80A coaxial with the counterbore 75A extends radially outward from the cavity 37 into the fitting 31. A cylindrical hole 75 extends from each counterbore 75A to the inner surface 73 of the link 70. A cylindrical hole 80 aligned with the hole 75 extends from each counterbore 80A to the outer surface 36 of the fitting 31.

A bushing 76 with a head 77 is press-fit into each hole 75, with the head seated in the corresponding counterbore 75A. A hole 87A extends along the centerline of each bushing 76 entirely through the bushing. A bushing 82 having a head 84 is press-fit into each hole 80 with the head 84 seated in the corresponding counterbore 80A. A hole 87B extends along the centerline of each bushing 82 entirely through the bushing. A fastener, e.g., a rivet 86, is installed in the holes 87A, 87B in each pair of bushings 76, 82 to join the link 70 to the fitting 31. The fastener 86 can alternatively constitute a bolt, interference fit pin or the like (not shown).

The rivets 86 are designed to break or fail when a predetermined shear load is applied thereto in response to the fitting 31 and link 70 attempting to move relative to one another in one or more directions, e.g., longitudinally and/or rotationally. Such movement can occur during or following refueling of the aircraft 10 by the tanker 12. The predetermined load is chosen to help insure that unwanted forces are not transferred to other parts of the probe 20 during refueling of the aircraft 10. In one example, the predetermined load can be about 1000 lbs and, more specifically, can be about 1500-2000 lbs.

An elastic band 89 can be placed over the exposed head of the rivets 86 to prevent broken rivets from leaving the link 70 upon separation from the fitting 31. In one instance, the band 89 can be bonded in place. The cavity 37 in the fitting 31 also helps to retain any broken rivets 76.

Referring to FIG. 3, the nozzle 90 is attached by an external threaded end 92 to the internal threaded end 94 of the link 70. The end 92 includes an annular groove 98 for receiving an O-ring 96 to fluidly seal the connection between the nozzle 90 and the link 70. The nozzle 90 is a standard design covered by Military Standard MS 24356 (ASG) Nozzle-Type MA-2 Flight Pressure Refueling. Consequently, in the interest of brevity, neither the receptacle 16 nor the nozzle 90 is discussed in further detail. It should be noted, however, that the nozzle is designed to be releasably coupled to/seated within the receptacle 16 and only allows for unidirectional fuel flow from the tanker 12 to the aircraft 10.

In operation, the tanker 12 approaches the aircraft 10 to be refueled and the aircrafts cooperate to align and couple the refueling probe 20 with the receptacle 16. More specifically, during refueling, the nozzle 90 is releasably coupled to the receptacle 16 to form a closed fluid path from the tanker 12 to the aircraft 10. Once the coupling between the components 16, 90 is made, fuel passing from the nozzle 90 towards the aircraft 10 must pass through the fuel transfer assembly 46 due to the connection between the tube 47 and the fitting 31. In other words, any fuel moving towards the second end 35 of the fitting 31 from the nozzle 90 flows along the length of the passageway 47A and enters the passageway 24 of the tube 23, without flowing into the annular space between the tube 47 and the fitting 31. The flanges 48, 50 on the tube 47 prevent the flow of fuel into the annular space.

The nozzle 90 and receptacle 16 couple together by forming a releasable connection, e.g., snap-fit, in conformity with the aforementioned Military Standard. The connection can withstand up to, for example, about 400 lbs of force before the probe 20 detaches from the receptacle 16. This is also the amount of force required to open a fueling valve (not shown) internal to the system to allow fuel to be delivered from the tanker 12 to the nozzle 90.

After fueling is accomplished, the aircraft 10 separates from the refueling apparatus 14 of the tanker 12. The nozzle 90 is designed to automatically separate or decouple from the receptacle 16 when the tanker 12 moves away from the aircraft, i.e., when the detaching force is achieved. In one example, the aircraft 10 slows relative to the tanker 12, which induces a longitudinal separating force on the drogue latch (not shown). In some instances, however, the nozzle 90 can become stuck in the receptacle 16, thereby risking damage to the receptacle and/or to the refueling probe 20. Without structure that allows the stuck nozzle 90 and receptacle 16 to separate from the refueling probe 20, the aircraft 10 could be damaged due to the transmission of the load from the probe into the aircraft.

To this end, the fasteners 74 securing the link 70 and fitting 31 together are designed to automatically rupture at the rivets 86 when the predetermined load is exceeded. Consequently, the predetermined load is configured to be large enough to allow for proper refueling of the aircraft 10 and proper detaching of the receptacle 16 from the nozzle 90 but to rupture when the forces acting on the fasteners 74 are indicative of an excessive bump, stuck drouge release latch, improper drogue separation or hose whip. Rupturing of the fasteners 74 allows the nozzle 90, which is stuck within the receptacle 16, to move relative to the remainder of the refueling nozzle 20. As a result, the nozzle 90 and link 70 are liberated/separated from the fitting 31 and allowed to move relative to one another to prevent undesirable forces from being transmitted from the tanker 12 to the aircraft 10.

A tethering member 110 (FIG. 3) connects the nozzle 90 to the refueling probe 20 to help prevent the liberated/detached nozzle from subsequently dislodging from the receptacle 16 and causing in-flight FOD. The tethering member 110 has a first end 112 secured to the fitting 31, tube 23 or fuel transfer assembly 46. In any case, the first end 112 is secured to portions of the refueling probe 20 that remain secured to the aircraft 10 when the fasteners 74 rupture. A second end 114 of the tethering member 110 is secured to the nozzle 90 or link 70. The tethering member 110 can constitute an elongated structure or cable formed from any inelastic material, such as steel.

As shown in FIG. 3, the tensioning member 110 extends within the interior of the refueling probe 20. More specifically, the tensioning member 110 extends through the passageways 47A of the fuel transfer assembly 46. The ends 112, 114 of the tethering member 110 are secured to the interior of the tube 23 and the interior of the nozzle 90, respectively (see FIG. 3). The tethering member 110 is secured to the tube 23 and the nozzle 90 via known means, e.g., fasteners, weld or the like. In either case, one or more devices (not shown) can secure the tensioning member 110 to the interior of the refueling probe 20 at positions along its length to help retain the tensioning member in place.

Figure 8A:
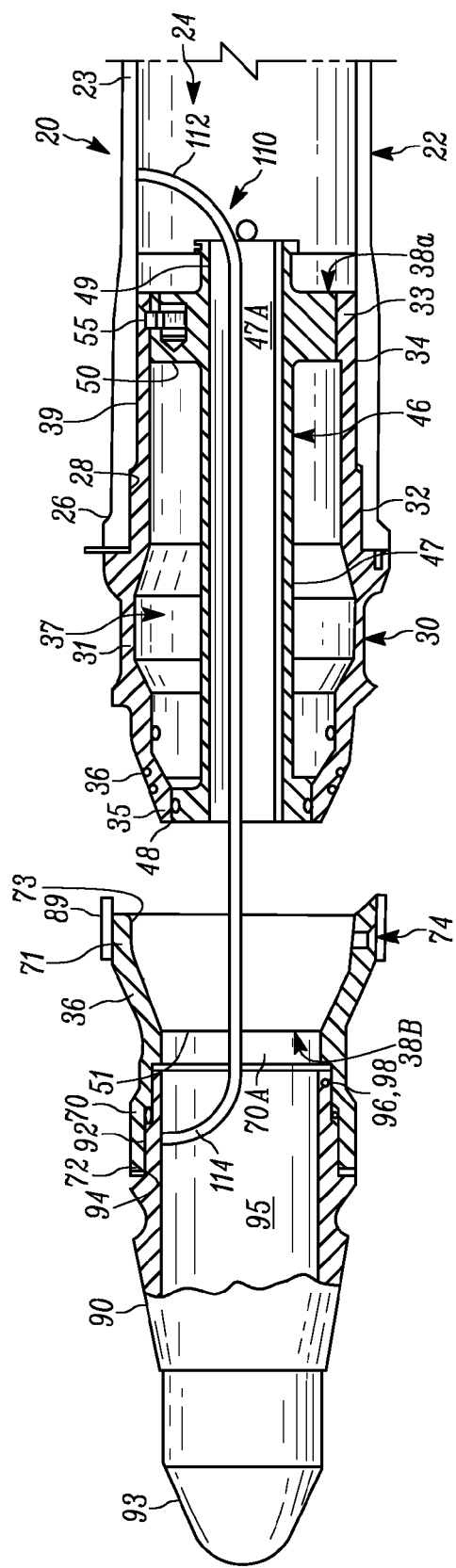
FIG. 8A is schematic view illustrating a tethering member in a first condition retaining a connection between components of a refueling probe.

The tethering member 110 cooperates with the nozzle 90 and tube 23 to selectively retain the liberated nozzle depending on the condition or nature of the connection between the nozzle 90 and the receptacle 16. Referring to FIG. 8A, a first condition occurs when the nozzle 90 is stuck but not properly seated within the receptacle 16. In this instance, the improperly seated nozzle 90 is wedged or stuck in the receptacle 16 sufficient to cause rupturing of the rivets 86 when the tanker 16 attempts to fly away from the aircraft 10. Due to the improper seating of the nozzle 90 in the receptacle 16, the nozzle could be subsequently detached from the receptacle 16 and cause FOD as the refueling aircraft 10 and tanker 12 separate or otherwise prior to the tanker landing. The tensioning member 110, however, is configured to pull the liberated and properly seated probe 90 and link 70 out of the receptacle 12 without rupturing. This advantageously allows the tanker 12 and aircraft 10 to separate while the tethering member 110 keeps the liberated nozzle 90 and link 71 connected to the aircraft, thereby helping to prevent FOD to the refueling aircraft or the tanker.

Figure 8B:
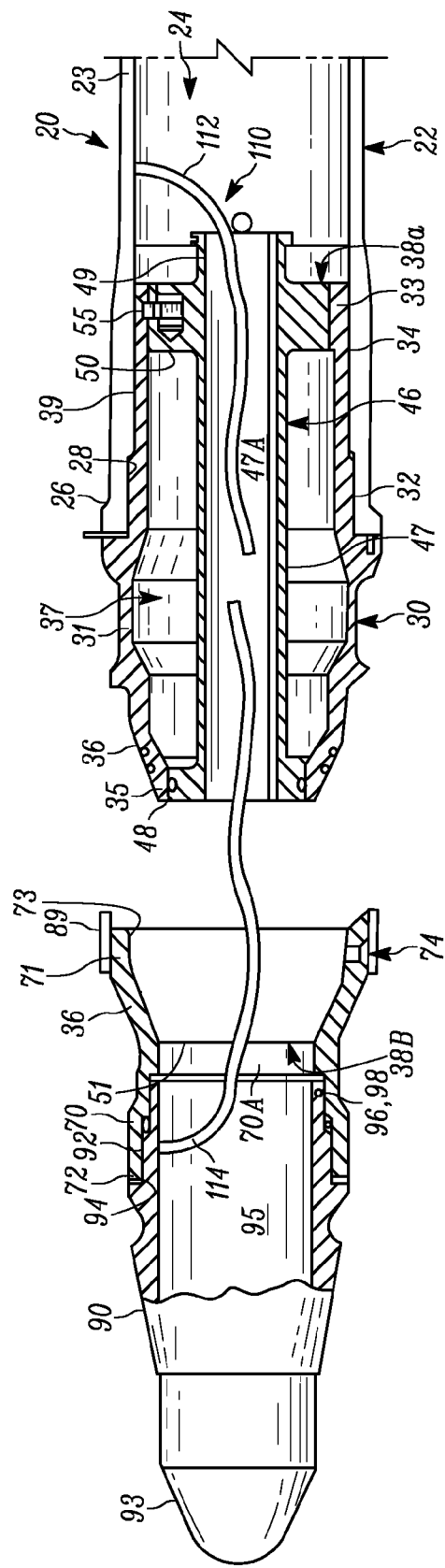
FIG. 8B is a schematic view illustrating the tethering member of FIG. 8A in a second condition allowing for the complete separation between the components of the refueling probe.

Referring to FIG. 8B, a second condition occurs when the nozzle 90 is fully/properly seated in the receptacle 12 but, nevertheless, stuck or lodged in place, unable to be removed when the tanker 12 and aircraft 10 attempt to separate. In this instance, the tethering member 110 is configured to rupture when the force applied by the liberated, properly seated nozzle 90 and link 70 exceeds a predetermined amount. This allows the refueling aircraft 10 to fly away from the tanker 12 while the tanker securely holds the liberated nozzle 90 and link 71 in the receptacle 16 until landing. The predetermined amount of force needed to rupture the tethering member 110 is configured to be less than the strength of the connections securing the ends 112, 114 of the tethering member to the refueling probe 20.

Figure 9:
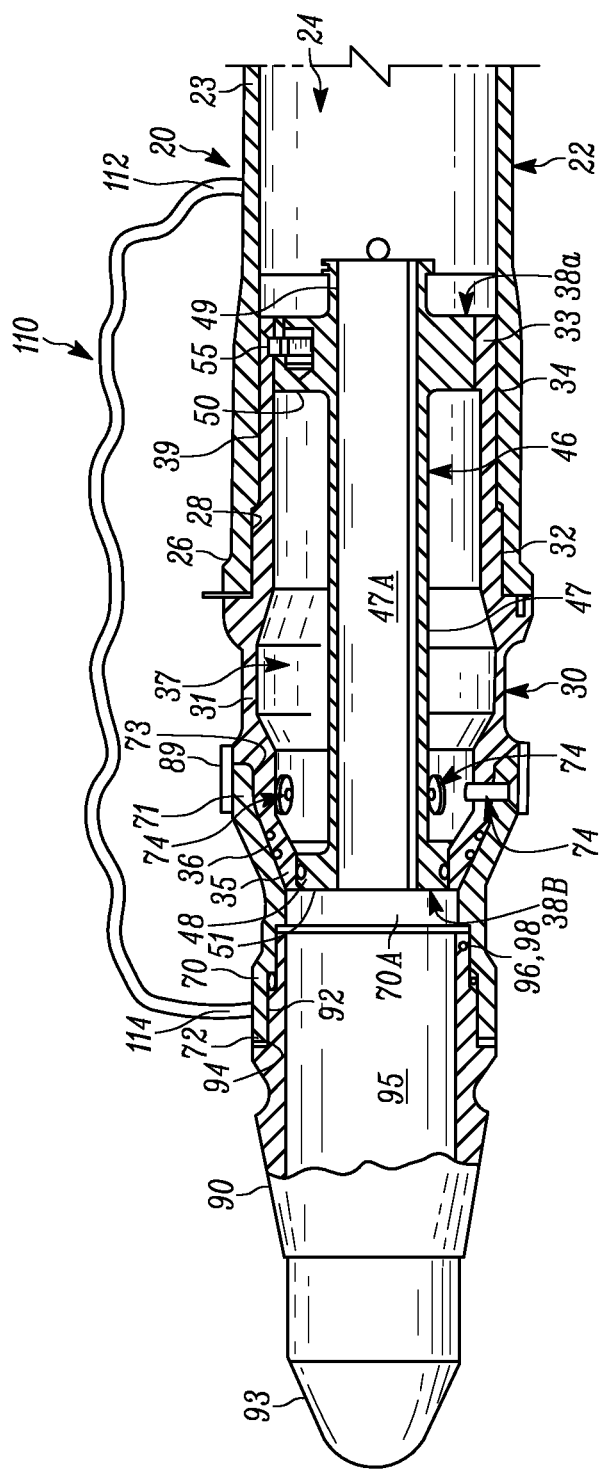
FIG. 9 is a partial cross-sectional view of FIG. 1 enlarged to show the refueling probe connected by an exterior tethering member to the receptacle on the tanker aircraft.
Figure 10A:
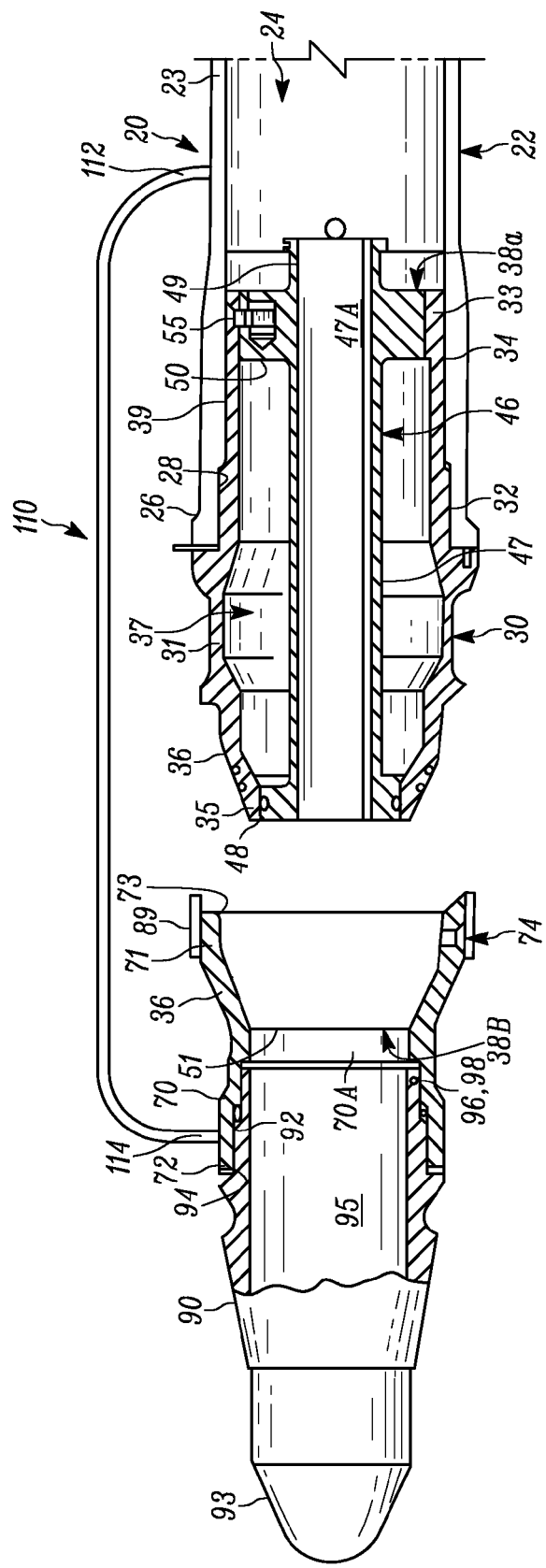
FIG. 10A is schematic view illustrating another configuration of a tethering member in a first condition retaining a connection between components of the refueling probe.
Figure 10B:
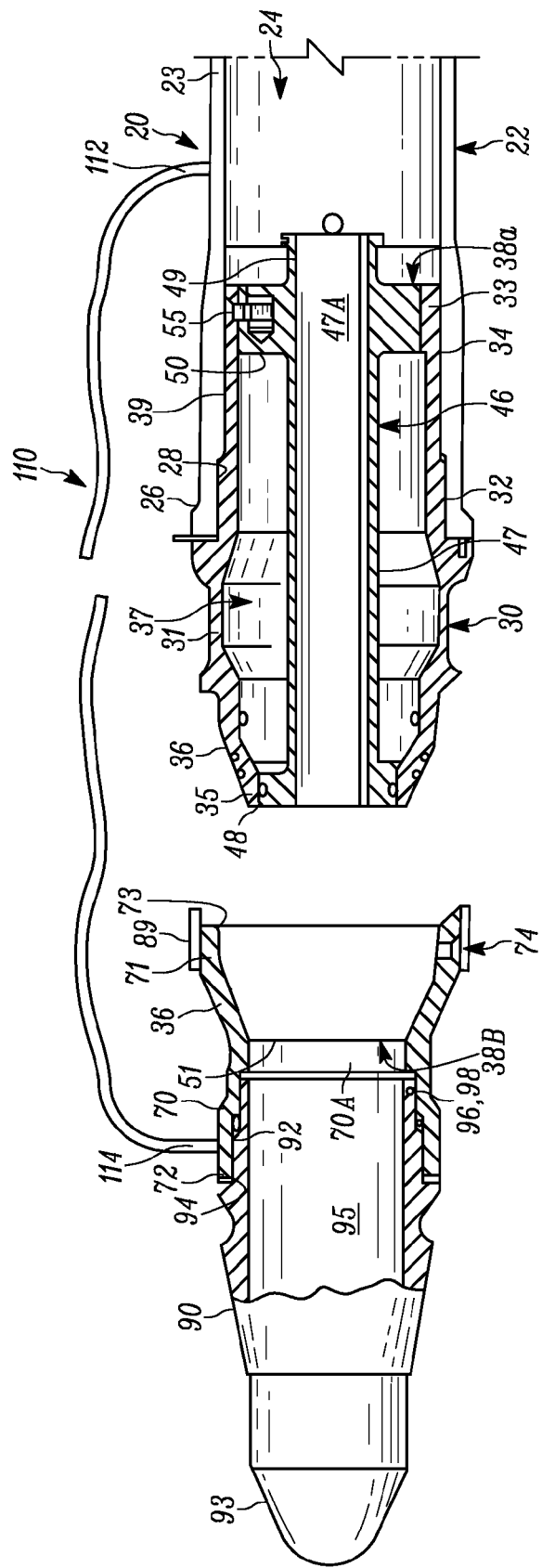
FIG. 10B is schematic view illustrating the tethering member of FIG. 10A in a second condition allowing for the complete separation between the components of the refueling probe.

In another example shown in FIGS. 9-10B, the tethering member 110 is secured to the exterior of the refueling probe 20. The ends 112, 114 are secured to the exterior of the tube 23 and the exterior of the nozzle 90, respectively. The tethering member 110 in FIGS. 9-10B is secured to the exterior of the refueling probe 20 in the same manner the tethering member in FIGS. 1-8B is secured to the interior of the refueling probe, and operates in the same manner.

It will be appreciated that the receptacle 16, refueling probe 20, and tethering member 110 operate in the same manner when the flying boom type refueling system is employed.

FIGS. 11A-11B is a chart illustrating example situations in which the tethering member 110 retains the refueling probe 20 and example situations in which the tethering member ruptures to allow the receptacle 16 to retain the refueling probe.

While the invention has been described with reference to a particular embodiment, it should be understood that the embodiment is merely illustrative as there are numerous variations and modifications, which can be made by those skilled in the art. In particular, the invention can be used on any tubular structure where one part must be separable from another without damage to connected structure. Thus, the invention is to be construed as being limited only by the spirit and scope of the appended claims.

What is claimed is:

1. An in-flight refueling probe for an aircraft to be refueled by a fuel dispensing aircraft having a receptacle for connecting to the refueling probe, the refueling probe comprising:
   a first tubular member secured to the aircraft;
   a second tubular member having a releasable connection with the first tubular member such that the second tubular member detaches from the first tubular member in response to a predetermined force applied to the connection;
   a nozzle secured to the second tubular member for coupling to the receptacle of the fuel dispensing aircraft and being in fluid communication with the first tubular member; and
   a tethering member having a first end connected to the first tubular member and a second end connected to one of the second tubular member and the nozzle, the tethering member remaining intact to connect the detached second tubular member to the first tubular member when a first tensile force is applied to the tethering member, the tethering member rupturing to disconnect the detached second tubular member from the first tubular member when a second tensile force greater than the first tensile force is applied to the tethering member.

2. The in-flight refueling probe of claim 1, wherein the releasable connection comprises a plurality of fasteners extending through openings in the first and second tubular members to join the first tubular member to the second tubular member, the fasteners rupturing in response to the predetermined force being applied to the connection to allow the second tubular member to detach from the first tubular member.

3. The in-flight refueling probe of claim 2, wherein the fasteners are rivets.

4. The in-flight refueling probe of claim 1, wherein the tethering member extends through an interior of the first tubular member and an interior of the second tubular member.

5. The in-flight refueling probe of claim 1, wherein the tethering member is secured to an exterior of the first tubular member and an exterior of the second tubular member.

6. The in-flight refueling probe of claim 1, wherein the tethering member is a cable.

7. The in-flight refueling probe of claim 1, wherein the first tensile force occurs when the nozzle is improperly coupled to the receptacle and the second tensile force occurs when the nozzle is properly coupled to the receptacle.

8. The in-flight refueling probe of claim 1, wherein the first tubular member includes a fitting secured to the second tubular member by the releasable connection and a tube connecting the fitting to the aircraft.

9. The in-flight refueling probe of claim 8, wherein the first end of the tethering member is secured to the tube.

10. The in-flight refueling probe of claim 1, further comprising a fuel transfer assembly secured to the first tubular member for fluidly connecting the nozzle with the first tubular assembly.

11. An in-flight refueling probe for an aircraft to be refueled by a fuel dispensing aircraft having a receptacle for connecting to the refueling probe, the refueling probe comprising:
    a first tubular member secured to the aircraft;
    a second tubular member releasably connected to the first tubular member by a plurality of fasteners extending through openings in the first and second tubular members, the fasteners rupturing in response to a predetermined force being applied to the fasteners to allow the second tubular member to detach from the first tubular member;
    a nozzle secured to the second tubular member for coupling to the receptacle of the fuel dispensing aircraft and being in fluid communication with the first tubular member; and
    a tethering member having a first end connected to the first tubular member and a second end connected to one of the second tubular member and the nozzle, the tethering member remaining intact to connect the detached second tubular member to the first tubular member when the nozzle is improperly coupled to the receptacle, the tethering member rupturing to disconnect the detached second tubular member from the first tubular member when the nozzle is properly coupled to the receptacle.

12. The in-flight refueling probe of claim 11, wherein the fasteners are rivets.

13. The in-flight refueling probe of claim 11, wherein the tethering member extends through an interior of the first tubular member and an interior of the second tubular member.

14. The in-flight refueling probe of claim 11, wherein the tethering member is secured to an exterior of the first tubular member and an exterior of the second tubular member.

15. The in-flight refueling probe of claim 11, wherein the tethering member is a cable.

16. The in-flight refueling probe of claim 11, wherein the first tubular member includes a fitting secured to the second tubular member by the releasable fasteners and a tube connecting the fitting to the aircraft.

17. The in-flight refueling probe of claim 16, wherein the first end of the tethering member is secured to the tube.

18. The in-flight refueling probe of claim 11, further comprising a fuel transfer assembly secured to the first tubular member for fluidly connecting the nozzle with the first tubular assembly.

19. An in-flight refueling probe for a fuel dispensing aircraft for refueling an aircraft having a receptacle for connecting to the refueling probe, the refueling probe comprising:
   a first tubular member secured to the fuel dispensing aircraft;
   a second tubular member having a releasable connection with the first tubular member such that the second tubular member detaches from the first tubular member in response to a predetermined force applied to the connection;
   a nozzle secured to the second tubular member for coupling to the receptacle of the aircraft and being in fluid communication with the first tubular member; and
   a tethering member having a first end connected to the first tubular member and a second end connected to one of the second tubular member and the nozzle, the tethering member remaining intact to connect the detached second tubular member to the first tubular member when a first tensile force is applied to the tethering member, the tethering member rupturing to disconnect the detached second tubular member from the first tubular member when a second tensile force greater than the first tensile force is applied to the tethering member.

* * * * *